(12) United States Patent
Auer et al.

(10) Patent No.: US 6,530,987 B1
(45) Date of Patent: Mar. 11, 2003

(54) METHOD FOR PRODUCING IRON OXIDE PIGMENTS FROM WASTE ACID RESULTING FROM TIO2 PRODUCTION

(75) Inventors: Gerhard Auer, Krefeld (DE); Günter Lailach, Krefeld (DE); Ulrich Meisen, Krefeld (DE); Werner Schuy, Tönisvorst (DE); Udo Julius, Neukirchen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/646,372
(22) PCT Filed: Mar. 17, 1999
(86) PCT No.: PCT/EP99/01736

§ 371 (c)(1),
(2), (4) Date: Sep. 15, 2000

(87) PCT Pub. No.: WO99/48815
PCT Pub. Date: Sep. 30, 1999

(30) Foreign Application Priority Data

Mar. 20, 1998 (DE) .......................... 198 12 260

(51) Int. Cl.$^7$ .......................... C01G 49/06; C01G 49/08
(52) U.S. Cl. .................. 106/456; 423/632; 423/633; 423/634
(58) Field of Search .................. 106/456; 423/632, 423/633, 634

(56) References Cited

U.S. PATENT DOCUMENTS

| | | | |
|---|---|---|---|
| 3,016,286 A | 1/1962 | Masukawa et al. | 23/118 |
| 3,970,738 A | 7/1976 | Matsui et al. | 423/140 |
| 4,137,292 A | 1/1979 | Tolley | 423/75 |
| 5,376,351 A | 12/1994 | Nencini et al. | 423/555 |
| 5,421,878 A | 6/1995 | Lerch et al. | 106/456 |

FOREIGN PATENT DOCUMENTS

| | | | |
|---|---|---|---|
| EP | 133 505 | | 6/1993 |
| EP | 638515 | * | 8/1994 |
| GB | 1421773 | | 10/1972 |
| GB | 1417713 | | 12/1975 |
| GB | 1471713 | * | 4/1977 |
| IN | 143745 | | 1/1978 |
| SU | 684049 | | 9/1979 |

OTHER PUBLICATIONS

EP and Derwnt abstracts for EPA 638,515.*

* cited by examiner

Primary Examiner—C. Melissa Koslow
(74) Attorney, Agent, or Firm—Godfried R. Akorli; Thomas W. Roy

(57) ABSTRACT

Process for the preparation of iron oxide pigments from the waste acid resulting from the preparation of titanium dioxide by the sulfate process, characterized in that in a first stage a partial neutralization of the sulfuric acid contained in the waste acid is performed with compounds from the group comprising metallic iron and/or iron compounds, the sulfuric acid is optionally further neutralized with a further alkaline compound, the precipitate containing Ti, Al, Cr and V compounds is separated from the resultant reaction product and an iron oxide yellow pigment or iron oxide black pigment is precipitated from the resultant iron sulfate-containing solution by addition of alkaline compounds as well as an oxidizing agent, each pigment being able to be baked to form an iron oxide red pigment.

16 Claims, No Drawings

US 6,530,987 B1

METHOD FOR PRODUCING IRON OXIDE PIGMENTS FROM WASTE ACID RESULTING FROM TIO₂ PRODUCTION

BACKGROUND OF THE INVENTION

The present invention relates to a process for the preparation of iron oxide pigments from waste acid occurring in the production of titanium dioxide by the sulfate process.

The preparation of iron oxide pigments from residues resulting from titanium dioxide production has already been known for a fairly long time, for example from DE-A 24 60 493 and JP-A 44 050 695. In particular, the iron sulfate heptahydrate (green salt) occurring in titanium dioxide production is used as a raw material for preparing iron oxide pigments. The typical procedure involved in this process is described for example in Ullmann's Encyclopedia of Industrial Chemistry, 5th ed., Vol. A 20, p. 297 et seq.

Waste acid, which also occurs in the production of titanium dioxide by the sulfate process, is however less suitable for preparing iron oxide pigments. Although iron oxides can also be obtained from waste acid in a similar way to processes normally used for the preparation of iron oxide pigments, the quality of these iron oxides falls far short of the requirements that high quality iron oxide pigments, in particular iron oxide red pigments or iron oxide yellow pigments, have to satisfy. The reason for this are undesirable constituents of the waste acid, such as compounds of Ti, Cr, V or Mn, which adversely affect the particle shape, particle size, stability and colour properties of the iron oxide pigments obtained therefrom. In addition the large amount of free sulfuric acid in the waste acid, which first of all has to be neutralised for the preparation of iron oxide pigments, adversely affects the profitability of the process.

The utilisation or at least harmless disposal of the waste acid is prescribed in Europe and in most other countries that produce titanium dioxide, with the result that various processes for utilisation have been developed over the course of time.

Printed specification EP-A 577 272 describes how a utilisable gypsum can be obtained from the waste acid by partial neutralisation with calcium carbonate. The metal sulfate solution remaining after separation of this material, which is also known as "white gypsum", is adjusted to a pH of approximately 9 by addition of CaO or $CaCO_3$, the material obtained thereby, which is also known as "red gypsum", then having to be disposed of. On the one hand valuable raw materials are obtained from a recycling, but on the other hand a large amount of valuable disposal space is used up since, depending on the titanium raw material, 1 to 2.5 tonnes of this waste is formed per tonne of $TiO_2$ pigment that is produced.

Another process for working up the waste acid, described in EP-A 0 133 505, avoids these disadvantages by reusing practically all the occurring waste acid for the preparation of $TiO_2$, wherein the waste acid is first of all concentrated and, after separating the filtration salts that are formed, the 65% to 85% sulfuric acid is reused to digest the ore. Sulfur dioxide is obtained from the filtration salts by thermal cracking and from this $SO_2$ pure sulfuric acid or oleum is obtained, which likewise are reused for digesting the ore. Although this process minimises the consumption of raw materials, it is very energy-intensive and therefore expensive to operate.

A further process for working up the waste acid, which is described in printed specification U.S. Pat. No. 3,016,286, involves the neutralisation of the waste acid and the precipitation and separation of hydroxides of Ti, Al, Cr and V, as well as the subsequent precipitation of magnetite with ammonia. The disadvantages of this process are however the fact that in the first place large amounts of ammonia are consumed in neutralising the free sulfuric acid, and the magnetite precipitated from the highly concentrated ammonium sulfate solution does not exhibit any pigment properties.

In a modification of the process described in printed specification EP-A 638 515 involving an extraction of magnesium from the ammonium sulfate-containing solution, pure ammonium sulfate can then be obtained by crystallisation and used as fertiliser. Although the amount of utilisable material is increased, the profitability of the process is however unsatisfactory on account of the additional process steps and the poor quality of the magnetite obtained from the highly concentrated ammonium sulfate solution.

Another variant for working up the waste acid comprises, according to U.S. Pat. No. 4,137,292 and DE-A 24 56 320, precipitating gypsum and magnetite simultaneously by neutralising the waste acid with calcium compounds, wherein in order to be able to utilise the two compounds a mechanical separation has to be carried out, for example by means of a hydrocyclone or by magnetic separation, which however provides neither pure gypsum nor a pure magnetite pigment despite the complicated and costly process steps. An optimisation of the process according to GB-A 1 421 773 is based on the fact that ammonium or alkali metal salts are simultaneously present in the precipitation of gypsum with calcium compounds, though this modification also does not avoid the aforementioned principal disadvantages of this process.

The presence of relatively large amounts of manganese in the iron salt solutions interferes in the preparation of iron oxide yellow or iron oxide red pigments. If the starting materials α-FeOOH or magnetite that are used for the preparation of iron oxide red contain more than 0.11 wt. % manganese, referred to iron, then no high grade red pigment can be obtained. The presence of Cr, V, Ti and other chromophoric metal ions or metal ions affecting the precipitation process likewise interfere.

The object of the invention is accordingly to develop a process that enables the occurring waste acid to be processed so as to produce qualitatively high grade iron oxide pigments.

It has now surprisingly been found that high quality iron oxide pigments can be prepared from the waste acid resulting from the production of titanium dioxide by the sulfate process, that a partial neutralisation of the free sulfuric acid contained in the waste acid is carried out with metallic iron and/or iron compounds, the undesired elements Ti, Al, Cr and V are at least partially precipitated as hydroxides and separated, and the iron sulfate-containing solution obtained after their separation is processed further into iron oxide pigments.

SUMMARY OF THE INVENTION

The invention accordingly provides a process for the preparation of iron oxide pigments from the waste acid resulting from the production of titanium dioxide by the sulfate process, characterised in that in a first stage a partial neutralisation of the sulfuric acid contained in the waste acid is carried out with compounds from the group comprising metallic iron and/or iron compounds, the sulfuric acid is optionally neutralised further with a further alkaline compound, the precipitate containing the Ti, Al, Cr and V compounds is separated from the resultant reaction product, and an iron oxide pigment is precipitated from the resultant iron sulfate-containing solution by adding alkaline compounds as well as an oxidizing agent.

DETAILED DESCRIPTION OF THE INVENTION

The undesirable elements Ti, Al, Cr and V are precipitated either during the addition of the metallic iron or of the iron compounds if this stage is carried out at a sufficiently high pH; the increase in the pH necessary to precipitate the undesirable elements may however also be achieved after completing the reaction with iron or iron compounds, by adding other alkaline compounds.

The iron sulfate-containing solution obtained after separating the undesirable elements may be converted either to a magnetite pigment, which can then be baked in a manner known per se to an iron oxide red pigment or iron oxide yellow pigment, or alternatively an iron oxide yellow pigment ($\alpha$-FeOOH) can be prepared from the iron sulfate-containing solution also after the precipitation process, which pigment can then be baked in a manner known per se to an iron oxide red pigment.

Metallic iron or basic iron compounds with a manganese content of <0.8 wt. % Mn, referred to Fe, are preferably used to neutralise the waste acid in the first stage. A manganese content of <0.4 wt. % Mn, referred to Fe, is particularly preferred. In this way particularly intensely coloured and high grade iron oxide red pigments can be obtained even from a waste acid that has a manganese content of 1 to 5 wt. % Mn, referred to Fe, in particular 1.5 to 2.5 wt. %.

The partial neutralisation of the sulfuric acid in the first stage is preferably carried out by adding metallic iron, iron oxides or iron hydroxides. The partial neutralisation of the waste acid in the first stage may also be carried out by a mixture of various iron-containing substances, for example a mixture of metallic iron and iron oxides and/or iron hydroxides. The process according to the invention is characterised in that, on account of the separation of the foreign metal hydroxides, even normally unsuitable iron waste materials that contain Cr, V, Ni, Co or other undesirable impurities can be used as raw material. It is particularly economical to use iron-containing residues that otherwise would have to be disposed of expensively, for example iron scrap, iron-containing production residues, for example iron oxide-containing residues from the Laux process, or mill scale, turnings or cast iron cuttings.

When using iron(III) compounds it has to be ensured that the Fe(III) content in the solution remains as low as possible, by simultaneous addition of metallic iron.

The successive use of several different sources of iron having different reactivities may be particularly favourable. For example, the neutralisation of the waste acid is preferably first of all performed with a less reactive material such as mill scale, and the further neutralisation of the now partially neutralised waste acid is then carried out with more reactive materials such as cast iron turnings.

Also, inert or insoluble constituents in the iron materials do not interfere since these can be separated and disposed of in the following stage together with the compounds precipitated in this stage.

It is advantageous to dilute the waste acid before the reaction with the iron compounds in order to reduce the viscosity of the reaction mixture and retain the resultant iron sulfate in solution. Either fresh water or a process water that occurs in the further course of the process can be used for the dilution.

The partial neutralisation of the sulfuric acid in the first stage with iron or iron-containing compounds is carried out at a pH of 0.5 to 4.7, preferably at a pH of 2.5 to 4.7. The solution is then optionally further neutralised to a pH of 3.0 to 5.0, preferably to a pH of 4.0 to 4.8, by the addition of further alkaline compounds.

In one embodiment of the present invention the neutralisation of the sulfuric acid in the first stage is carried out in two steps, preferably with two iron materials of different reactivity, whereas in the first step the less reactive iron material is added in a pH range of 0.5 to 3.5 and in the second step the more reactive iron material is added in a pH range 2.5–4.7.

The precipitate of the hydroxides of Ti, Al, Cr, V and Fe(III) obtained in this way is separated from the liquid phase and can either be disposed of or used as raw material for obtaining Ti, Al, Cr or V. Undissolved constituents originating from the raw materials that are used are optionally separated at this point together with the hydroxides. Fe(III) that may possibly be present before the precipitation of the Ti-, Al-, Cr- and V-containing precipitate is preferably reduced to Fe(II) by adding a reducing agent, in particular metallic iron. In this way the amount of precipitate from the second precipitation stage that has to be disposed of or utilised further is reduced and the yield of high grade iron oxide pigment in the following stage is increased. In the reduction of the Fe(III) the reaction should however be controlled so that as little $Ti^{3+}$ as possible is formed, which would then not be precipitated so well as $Ti^{4+}$. The precipitation of the titanium can if necessary be improved by adding crystallisation seeds of hydrated titanium oxide.

If for the neutralisation of the waste acid further alkaline compounds are also used in addition to metallic iron or iron compounds, it is recommended to use compounds that form easily filtrable sparingly soluble sulfates, for example CaO or $Ca(OH)_2$, so that the filterability of all the resultant solids is significantly improved. The use of power station ash, refuse incineration ash or another alkaline-reacting ash as neutralising agent is particularly preferred.

The iron sulfate-containing solution obtained after separation of the Ti-, Al-, Cr- and V-containing solids preferably has a manganese content of <0.9 wt. %, particularly preferably of <0.5 wt. %, referred to Fe.

Iron oxide yellow pigments ($\alpha$-FeOOH, Goethite) and iron oxide black pigments ($Fe_3O_4$, magnetite) can be prepared in a manner known per se by the precipitation process, from the iron sulfate-containing solution obtained after separation of the solids (Ullmanns Encyclopedia of Industrial Chemistry, 5th ed., Vol. A 20, p. 297 et seq). Although it is possible to prepare iron oxide red by the precipitation process, it is substantially more difficult.

For the precipitation of the iron oxide, the iron sulfate-containing solution is preferably adjusted to a concentration of 150 to 250 g, particularly preferably to 180 to 190 g $FeSO_4$ per litre. This concentration can optionally be adjusted by evaporation or dilution. This adjusted iron sulfate-containing solution is converted in a manner known per se with the addition of alkaline compounds and an oxidizing agent to form a magnetite pigment or iron oxide yellow pigment.

To precipitate the iron oxide yellow pigment ($\alpha$-FeOOH) preferably 4 to 30 times the amount (calculated as Fe) of $FeSO_4$ is added in the form an aqueous solution to an $\alpha$-FeOOH seed prepared in a manner known per se (Ullmann's Encyclopedia of Industrial Chemistry, 5th ed., Vol. A20, p. $29^7$ et seq), and heated to a temperature of between 60° and 85° C. while stirring. Oxidation is then carried out with an oxidizing agent while the pH value of the solution is adjusted to an end pH of 3.0 to 5.0 at a rate of 0.01 to 0.4 pH units/hour. In addition alkaline-reacting compounds that do not form sparingly soluble sulfates, for example gaseous $NH_3$ or $NH_3$ dissolved in water, NaOH, KOH, MgO or $Mg(OH)_2$, are added as precipitating agent. As oxidizing agent there may for example be used compounds from the group comprising oxygen, ozone, $H_2O_2$, sodium hypochlorite, chloride of soda, chlorates, perchlorates, nitrates and chlorine. Oxygen or an oxygen-containing gaseous mixture, in particular air, is preferably passed into the reaction mixture. The oxidation is preferably terminated as soon as the Fe-II content of the suspension is less than 1 mole-%.

Modifiers that control the particle shape and the particle size distribution may be added during the pigment formation. Aluminium compounds and zinc compounds as well as phosphates are particularly effective for this purpose. Organic modifiers such as aliphatic amines, hydroxycarboxylic acids, aliphatic alcohols or carboxylic acids or their derivatives may however also be used.

The pigment suspensions are worked up by means of the known steps of filtration, drying and grinding. By suitably varying the preparation conditions, the person skilled in the art is able to prepare a broad range of iron oxide yellow pigments of various particle sizes and thus various shades.

For the preparation according to the invention of an iron oxide black pigment (magnetite) an amount of a precipitating agent is preferably added to the iron sulfate-containing solution so that the ratio of iron(II) to precipitating agent is 0.4 to 0.65, particularly preferably 0.5 to 0.58 equivalents. For this purpose preferably the calculated amount of the precipitating agent is pumped into the iron sulfate-containing solution at a temperature between 60° and 95° C., in particular between 75° and 95° C. Alkaline-reacting compounds that do not form sparingly soluble sulfates, for example gaseous $NH_3$ or $NH_3$ dissolved in water, NaOH, KOH, MgO or $Mg(OH)_2$, are used as precipitating agent. Compounds for example from the group comprising oxygen, ozone, $H_2O_2$, sodium hypochlorite, chloride of soda, chlorates, perchlorates, nitrates and chlorine are then added as oxidizing agent. Preferably oxygen or an oxygen-containing gaseous mixture, in particular air, is passed into the reaction mixture. The pH of the solution is preferably maintained substantially constant. The oxidation is preferably terminated as soon as the Fe(II) content of the suspension is less than 1 mole-%.

The pigment suspensions are worked up by means of the known steps of filtration, drying and grinding. By suitably varying the preparation conditions, the person skilled in the art is able to prepare a broad range of iron oxide black pigments of various particle sizes and thus various shades and stability.

By means of the aforedescribed processes it is possible to prepare from waste-acid α-FeOOH or $Fe_3O_4$ with a manganese content of $\leq 0.11$ wt. % Mn, preferably $\leq 0.06$ wt. % Mn, referred to iron. On account of their low manganese content these compounds are particularly suitable for baking to form iron oxide red pigments.

To prepare iron oxide red pigments ($Fe_2O_3$) an α-FeOOH or $Fe_3O_4$ prepared according to the invention is calcined at temperatures between 350° and 1000° C., particularly preferably between 600° and 900° C., in the presence of an oxygen-containing gas. The implementation of the process according to the invention is not restricted to the use of a certain type of furnace. The calcination may for example be carried out in a fluidised bed furnace, a box furnace or a rotary kiln. The corresponding necessary residence times should be matched to the furnace that is used. Following the calcination a grinding is normally necessary, especially when calcination temperatures above 600° C. are employed. A dry grinding is preferably performed, with the addition of a conventional grinding aid, for example amines, alcohols or polyacrylates. Since the iron oxide red pigment prepared according to the invention does not on account of its narrow particle size distribution and its low degree of agglomeration require a particularly intensive grinding, a broad range of mills can be employed. Jet mills, impact mills, pendulum mills and roller mills are suitable for grinding the red pigments obtained according to the invention.

A preferred form of the process according to the invention comprises using ammonia in gaseous form or dissolved in water, to precipitate the iron oxide pigment. The ammonia can then be recovered wholly or partially from the $(NH_4)_2SO_4$-containing solution obtained after separating the iron oxide pigment, by adding CaO. After addition of CaO or $Ca(OH)_2$ up to a pH value of approximately 10, ammonia is released in gaseous form and can be reused directly without compression or any other treatment, for the iron oxide precipitation. Particularly preferably the residual ammonium content is removed from the suspension from which the gaseous ammonia was obtained after the addition of the CaO or $Ca(OH)_2$, by stripping with steam or air in a stripping column. The aqueous ammonia solution obtained in this way can be reused without further treatment in the iron oxide precipitation.

The gypsum-containing precipitate remaining after the ammonia recovery can be filtered off and, after neutralisation, be utilised for example as a building material after washing with dilute sulfuric acid. The alkaline filtrate contains essentially magnesium sulfate and can be used as fertiliser or, after neutralisation, discharged as waste water containing neutral salts.

Alternatively the ammonia can be released by adding barium oxide, hydroxide or carbonate, with the formation of barium sulfate.

The iron oxide pigments obtained according to the invention have particularly good pigment optical properties since the iron sulfate-containing starting solution used for this purpose contains, on account of the preliminary precipitation of the metal hydroxides, particularly small amounts of heavy metals, in particular small amounts of Cr and V. By means of the process according to the invention it is possible to process the waste acid into high grade pigments using simple industrial operations and with a comparatively low energy expenditure, and to reduce the amount of waste to a minimum, preferably to approximately 0.2 to 0.7 tonne of disposable waste per tonne of produced $TiO_2$. Furthermore the process according to the invention even enables industrial residues to be used efficiently to prepare qualitatively high grade iron oxide pigments, the profitability of the process thereby being considerably improved. Of particular economic importance is the ability to be able to use relatively unreactive or impure iron-containing materials that cannot be employed, or only with great effort and expense, in other production processes for producing iron oxide pigments.

The iron oxide pigments obtained according to the invention may be used to colour paints, lacquers, plastics, building and construction materials, paper or other materials. The magnetite obtained according to the invention may furthermore also be used as a magnetic pigment for toners.

The shade of the iron oxide pigment that is obtained is determined according to the following procedure:

Measurement of the pure shade iron oxide pigments:

The pigment is dispersed using a muller (plate-type colour dispersing machine) in an air-drying lacquer system. The lacquer system (lacquer) consists of the following components:

| | |
|---|---|
| 95.26% | ® ALKYDAL F 48 binder, Bayer AG, middle oil, air-drying alkyd resin based on drying vegetable fatty acids in a 38:7 mixture of white spirit/xylene with a non-volatile fraction of ca. 55%, oil content/tri-glyceride in the non-volatile fraction ca. 48%, phthalic anhydride in the non-volatile fraction ca. 26%) |
| 0.78% | 2-butanone oxime, 55% in white spirit (anti-skinning agent) |
| 1.30% | ® Octa Soligen Calcium (wetting agent, calcium salt of branched $C_6$–$C_{19}$ fatty acids in a hydrocarbon mixture (containing 4% Ca), Borchers AG) |
| 0.22% | ® Octa Soligen Cobalt 6 (drying agent, cobalt(2+) salt of branched $C_6$–$C_{19}$ fatty acids in a hydrocarbon mixture (containing 6% Co), Borchers AG) |
| 0.87% | ® Octa Soligen Zirconium 6 (drying agent, zirconium salt of branched $C_6$–$C_{19}$ fatty acids in a hydrocarbon mixture (containing 6% Zr), Borchers AG) |
| 1.57% | Glycolic acid n-butyl ester (= butyl hydroxyacetate) (flow improver). |

The components are mixed in a high-speed stirrer to form the finished lacquer. A plate-type colour dispersing machine (muller) is used, as described in DIN EN ISO 8780-5 (April 1995). An ®ENGELSMANN JEL 25/53 muller with an effective plate diameter of 24 cm is used. The rotational speed of the lower plate is ca. 75 min$^{-1}$. By suspending a 2.5 kg weight on the loading stirrup the force between the plates can be adjusted to ca. 0.5 kN. 0.8 g of pigment and 2.00 g of lacquer are dispersed in one stage at 100 revolutions using a 2.5 kg weight according to the process described in DIN EN ISO 8780-5 (April 1995) Section 8.1. The muller is opened an d the lacquer is quickly collected on the lower plate outside the centre point. A further 2.00 g of lacquer are then added and the plates are brought together. The preparation is finished after two further stages each of 50 revolutions and without any load.

The pigmented lacquer is applied using a film coater (gap width at least 150 μm, at most 250 μm) on a non-absorbent paperboard. The coated paperboard (lacquer coat) is then dried for at least 12 hours at room temperature. Before the colour measurement the lacquer coat is dried and cooled for one hour at ca. 65° C. (±5° C.).

Measurement of the optical brightening of iron oxide pigments:

The pigment and the optical whitener are dispersed using a muller (plate type colour dispersing machine) in an air-drying lacquer system. A commercially available ®Bayertitan R-KB-2 titanium dioxide pigment (Bayer AG) is used as optical whitener. This pigment corresponds to Type R 2 in ISO 591-1977. The lacquer system (lacquer) corresponds to that used to determine the pure shade (see above).

The components of the lacquer system are mixed in a high-speed stirrer to produce the finished lacquer.

The pigmented lacquer and the lacquer coat are produced as described for the measurement of tile pure shade (see above), 0.1500 g of the pigment to be tested, 0.7500 g of Bayertitan R-KB-2 and 2.00 g of lacquer being weighed out.

Colour measuring instrument:

A spectrophotometer ("colour measuring instrument") with an Ulbricht globe having a measuring geometry of d/8 without a gloss trap is used for the measurements. This measuring geometry is described in ISO 7724/2-1984 (E) Point 4.1.1, in DIN 5033 Part 7 (July 1983) Point 3.2.4 and in DIN 53 236 (January 1983) Point 7.1.1. A ®Dataflash 2000 measuring instrument of Datacolor International is used for the measurements.

The colour measuring instrument is calibrated against a white, ceramic work standard as described in ISO 7724/2-1984 (E) Point 8.3. The reflection data of the work standard against an ideally matt-white body are fed into the colour measuring instrument so that, after calibration with the white work standard, all colour measurements are referred to the ideally matt-white body. The black point calibration is performed with a black hollow body supplied by the manufacturer of the colour measuring instrument.

Colour measurement:

Any gloss trap present is disconnected. The temperature of the colour measuring instrument and test piece is ca. 25° C.±5° C.

The lacquer coat is applied to the colour measuring instrument in such a way that the measurement opening covers a central point of the lacquer layer. The coat must be. applied fully and smoothly. The measurement opening must be completely covered by the lacquer layer. The measurement is then performed.

Calculation of the CIE coordinates:

The CIE coordinates L*, a* and b* of 1976 are calculated from the measured reflection spectrum according to the calculation instructions given in ASTM E 308-1985, Point 7. The weighting functions of the standard illuminant C and of the 2°-standard observer of 1931 in ASTM E 308-1985, Table 5.6, are employed. The wavelength range is between 400 nm and 700 nm. The wavelength interval is 20 nm. No gloss is deducted in the calculations. The remission values obtained are converted according to DIN 5033, Part 3 (July 1992) to the CIELAB colour data system.

The relative colouring strength is calculated in a similar way to the relative scattering capacity according to DIN 53 165 (Point 3.4) using Bayertitan R-KB-2 as optical whitener and a suitable Bayferrox reference pigment (instead of carbon black). ρ is used as the standard colour value Y/100.

The invention is described hereinafter by way of example, though this should not be regarded as restricting the scope of the invention. The parts and percentages given in the examples refer to parts and percentages by weight, unless otherwise specified.

EXAMPLE 1

Preparation of the Iron Sulfate-containing Solution for the Precipitation of Iron Oxide Pigments 46.6 g of cast iron turnings (composition see below) are added at 80° C. during 170 minutes to 250 g of waste acid (composition see below) with a manganese content of 2.05% Mn, referred to Fe. The pH value of the solution rises to 3.6. CaO is then added up to a pH of 4.5. After diluting with 350 g of water and separating the precipitate by filtration, 549 g of clear, green solution is obtained with a $FeSO_4$ content of 17.6% and a manganese content of 0.48% Mn referred to Fe. The Fe content of the solution is 6.46%. In addition 37.7 g of filter cake (dry) are obtained. The solution is adjusted up to the further processing with a small amount of sulfuric acid to a pH of 2, in order to avoid oxidation of the Fe(II).

|  | Waste acid | Cast iron turnings | FeSO₄ solution |
| --- | --- | --- | --- |
| pH | <0 | — | 4.4 |
| $H_2SO_4$ | 24.2% | — | — |
| Fe | 2.98% | 91.1% | 6.46% |
| Ti | 0.38% | — | <0.001% |
| Al | 0.31% | 0.28% | 0.002% |
| Cr | 0.030% | 0.006% | <0.001% |
| Mn | 0.061% | 0.09% | 0.031% |
| Mg | 0.64% | 0.22% | 0.245% |
| Mn/Fe | 0.0205 | 0.00099 | 0.0048 |

EXAMPLE 2

Preparation of the Iron Sulfate-containing Solution for the Precipitation of Iron Oxide Pigment 80 g of cast iron turnings (composition see Example 1) are added at 80° C. during 170 minutes to 250 g of waste acid (composition as in Example 1) with a manganese content of 2.05% Mn, referred to Fe. The pH value of the solution rises to 4.4. After diluting with water and separating the precipitate by centrifugation, a clear, green $FeSO_4$ solution is obtained having a manganese content of 0.49% Mn, referred to Fe.

EXAMPLE 3

Preparation of the Iron Sulfate-containing Solution for the Precipitation of Iron Oxide Pigment 250 g of waste acid (composition as Example 1) with a manganese content of 2.05% Mn, referred to Fe, is reacted at 80° C. for 4 hrs with 50 g of mill scale with a manganese content of 1.9% Mn. The pH value of the solution rises to 1.1. Cast iron turnings (composition as in Example 1) are then added till the pH of the solution is 4.4. After diluting with water and separating the precipitate by filtration, a clear, green $FeSO_4$ solution is obtained.

EXAMPLE 4

Preparation of Iron Oxide Black Pigment (Magnetite)

2.864 kg of the iron sulfate solution obtained according to Example 1 (during the intermediate storage adjusted to pH <2 with sulfuric acid in order to prevent oxidation) is diluted with 2.673 kg of water, placed in a vessel provided with a stirrer and gassing device, and heated to 85° C. 0.66 kg of a 25% caustic soda solution (318 kg NaOH/l) is next added in order to adjust the pH value of the reaction mixture to 7.0. Air is then gassed in at a rate of 0.1 m³/hr until there is a potential jump in the solution from ca. −700mV to approximately −200mV (after approximately 4.5 hr); the pH moves during the gassing to a value of approximately 4.5. The precipitated magnetite is suction filtered and washed with 0.50 kg of water. 5.479 kg of filtrate, 0.52 kg of wash filtrate and 0.302 kg of filter cake with a solids content of 64.9% (heating at 60° C. to constant weight) are obtained. After drying the filter cake in a circulating air drying cabinet at 60° C. and deagglomeration with a hammer bar mill, 0.196 kg of magnetite is obtained having the following properties:

| Ca: | 0.002% | |
| --- | --- | --- |
| $SO_4$: | 2.41% | |
| Fe: | 68.8% | |
| Ti: | 0.002% | |
| Mg: | 0.005% | |
| Mn: | 0.039% | |
| Cr: | <0.001% | |
| V: | 0.001% | |
| Al: | 0.021% | |
| Na: | 0.054% | |
| Mn/Fe: | 0.00057 | |
| BET: | 7.4 m²/g | |
| Pure shade: | | $L^* = 12.4$ |
| | | $a^* = 0.8$ |
| | | $b^* = -0.4$ |
| | | $\Delta L^* = -0.3$ (against Bayferrox 330) |
| | | $\Delta a^* = -0.1$ (against Bayferrox 330) |
| | | $\Delta b^* = -1.3$ (against Bayferrox 330) |
| Optical brightening: | | $L^* = 54.8$ |
| | | $a^* = 0.5$ |
| | | $b^* = -3.8$ |
| | | $\Delta L^* = -1.9$ (against Bayferrox 330) |
| | | $\Delta a^* = -0.1$ (against Bayferrox 330) |
| | | $\Delta b^* = -0.5$ (against Bayferrox 330) |

The relative tinting strength against Bayferrox 330 is 118%.

EXAMPLE 5

Preparation of Iron Oxide Yellow Pigment (α-FeOOH)

3.697 kg of the iron sulfate solution obtained according to Example 1 (during the intermediate storage adjusted to pH <2 with sulfuric acid in order to prevent oxidation) and 1.43 l of industrially used (α-FeOOH seeds containing 32.5 g/l of FeOOH (Ullmann's Encyclopedia of Industrial Chemistry, 5th ed., Vol. A20, p. 297 et seq) are placed in a vessel equipped with stirrer and gassing device and heated to 85° C. The solution is then adjusted to a pH of 3.8 by adding caustic soda (318 g NaOH/l) continuously over 3 hrs, at the same time gassing with 33 l/h of air. Gassing is then continued for a further 5 hrs, the pH value being maintained at 3.8 by addition of NAOH.

The precipitated iron oxide yellow pigment is suction filtered and washed with water until the conductivity of the filtrate is <50 μS.

4.254 kg of filtrate, 2.407 kg of wash filtrate and 1.684 kg of filter cake with a solids content of 42.0% (heating at 60° C. to constant weight) are obtained. After drying the filter cake in a circulating air drying cabinet at 60° C. and deagglomeration with a hanger bar mill, 0.707 kg of iron oxide yellow pigment is obtained having the following properties:

| Ca: | 0.001% | |
| --- | --- | --- |
| $SO_4$: | 1.2% | |
| Fe: | 61.3% | |
| Ti: | 0.001% | |
| Mg: | 0.003% | |
| Mn: | 0.026% | |
| Cr: | <0.001% | |
| V: | <0.001% | |
| Al: | 0.013% | |
| Na: | 0.012% | |
| Mn/Fe: | 0.0004 | |
| BET: | 22.4 m²/g | |
| Pure shade: | | $L^* = 62.7$ |
| | | $a^* = 7.8$ |
| | | $b^* = 45.6$ |

-continued

|                      |                                                  |
|----------------------|--------------------------------------------------|
|                      | ΔL* = 0.9 (against Bayferrox 1410 M)             |
|                      | Δa* = −2.5 (against Bayferrox 1410 M)            |
|                      | Δb* = −1.4 (against Bayferrox 1410 M)            |
| Optical brightening: | L* = 82.5                                        |
|                      | a* = 3.6                                         |
|                      | b* = 38.2                                        |
|                      | ΔL* = 0.4 (against Bayferrox 1410 M)             |
|                      | Δa* = −1.2 (against Bayferrox 1410 M)            |
|                      | Δb* = 0.0 (against Bayferrox 1410 M)             |

The relative tinting strength against Bayferrox 1410 M is 95%.

EXAMPLE 6

Calcination of the Iron Oxide Black Pigment 20 g of the magnetite obtained according to Example 4 are baked to form an iron oxide red pigment by heating the magnetite in a ceramic dish in a chamber furnace in an air stream of 600 l/h at a heating rate of 4° C./min and removing the dish from the furnace when the temperature is 600° C.

After grinding for 60 seconds in a disintegrator mill an iron oxide red pigment is obtained having the following properties:

|                      |                                         |
|----------------------|-----------------------------------------|
| Pure shade:          | L* = 33.8                               |
|                      | a* = 20.9                               |
|                      | b* = 11.8                               |
|                      | ΔL* = 2.0 (against Bayferrox 180 M)     |
|                      | Δa* = 2.4 (against Bayferrox 180 M)     |
|                      | Δb* = 3.4 (against Bayferrox 180 M)     |
| Optical brightening: | L* = 63.7                               |
|                      | a* = 15.7                               |
|                      | b* = 3.8                                |
|                      | ΔL* = −2.7 (against Bayferrox 180 M)    |
|                      | Δa* = 3.7 (against Bayferrox 180 M)     |
|                      | Δb* = 3.6 (against Bayferrox 180 M)     |

The relative tinting strength against Bayferrox 180 M is 129%.

EXAMPLE 7

Calcination of the Iron Oxide Yellow Pigment 20 g of the iron oxide yellow pigment obtained according to Example 5 are baked to form an iron oxide red pigment by heating the iron oxide yellow pigment in a ceramic dish in a chamber furnace in an air current of 600 l/h at a heating rate of 4° C./min, and removing the dish from the furnace when the temperature reaches 600° C.

After grinding for 60 seconds in a disintegrator mill an iron oxide red pigment is obtained having the following properties:

|                      |                                         |
|----------------------|-----------------------------------------|
| Pure shade:          | L* = 41.7                               |
|                      | a* = 26.2                               |
|                      | b* = 22.1                               |
|                      | ΔL* = 1.7 (against Bayferrox 110 M)     |
|                      | Δa* = −1.6 (against Bayferrox 110 M)    |
|                      | Δb* = −0.6 (against Bayferrox 110 M)    |
| Optical brightening: | L* = 59.9                               |
|                      | a* = 27.0                               |
|                      | b* = 22.4                               |

|                      |                                         |
|----------------------|-----------------------------------------|
|                      | ΔL* = 1.1 (against Bayferrox 110 M)     |
|                      | Δa* = 0.6 (against Bayferrox 110 M)     |
|                      | Δb* = 3.0 (against Bayferrox 110 M)     |

The relative tinting strength against Bayferrox 110 M is 111%.

EXAMPLE 8 (Comparison Example)

20 kg of waste acid are introduced at 70° to 80° C. together with 5.00 kg $NH_3$ to a stirred vessel and neutralised at a constant pH of 5.0. 0.38 kg of a metal hydroxide-containing precipitate is obtained, which is separated by filtration. The remaining solution (54 kg) contains approximately 36% $(NH_4)_2SO_4$, 4.2% $FeSO_4$, 0.08% $MnSO_4$, 3.3% $MgSO_4$ and approximately 56% of water.

This solution is oxidised in a second stage with ca. 2 $m^3$ of air and maintained at a pH of 7.0 during the oxidation by further addition of 0.51 kg of $NH_3$. After filtration 1.14 kg of solids (magnetite) as well as 53.5 kg of ammonium sulfate solution containing about 40.0%$(NI)_2SO_4$ are obtained.

Characterisation according to the method described in the text provides the following results:

|                      |                                      |
|----------------------|--------------------------------------|
| Optical brightening: | L* = 64.5                            |
|                      | a* = 0.0                             |
|                      | b* = −0.4                            |
|                      | ΔL* = 1.6 (against Bayferrox 306)    |
|                      | Δa* = 0.1 (against Bayferrox 306)    |
|                      | Δb* = 0.4 (against Bayferrox 306)    |

Bayferrox 306 is the black pigment with the lowest colouring strength. Since the magnetite obtained from the highly concentrated ammonium sulfate solution has an even higher optical brightening and an even lower colouring strength, it is unsuitable as a pigment.

EXAMPLE 9

Calcination of Iron Oxide Black Pigment
(Comparison Example)

20 g of the magnetite obtained according to Example 8 are placed in a ceramic dish and heated in a chamber furnace in an air stream of 600 l/h at a heating rate of 4° C./min and removed from the furnace when the temperature reaches 600° C.

After grinding for 60 seconds in a disintegrator mill a product is obtained having the following properties:

|                      |                                         |
|----------------------|-----------------------------------------|
| Pure shade:          | L* = 28.8                               |
|                      | a* = 5.4                                |
|                      | b* = 3.8                                |
|                      | ΔL* = −3.1 (against Bayferrox 180 M)    |
|                      | Δa* = −13.1 (against Bayferrox 180 M)   |
|                      | Δb* = −4.6 (against Bayferrox 180 M)    |
| Optical brightening: | L* = 81.6                               |
|                      | a* = 23.7                               |
|                      | b* = 2.3                                |
|                      | ΔL* = 15.1 (against Bayferrox 180 M)    |
|                      | Δa* = −8.3 (against Bayferrox 180 M)    |
|                      | Δb* = 2.0 (against Bayferrox 180 M)     |

The relative tinting strength against Bayferrox 180 M is only 18%.

No iron oxide red pigment can be prepared from the iron sulfate solution of Example 9. The colour of the resultant product is brown. Use of the product as a brown pigment is excluded on account of the poor tinting strength.

What is claimed is:

1. A process for the preparation of an iron oxide pigment from the waste acid resulting from the preparation of titanium dioxide by the sulfate process comprising
   a) obtaining a precipitate containing at least one of Ti, Al, Cr and V compounds by partially neutralizing in a first stage the sulfuric acid contained in the waste acid with metallic iron and/or an iron compound, wherein the metallic iron and the basic iron compounds have a manganese content of <0.8% by weight of Mn, based on Fe.
   b) optionally obtaining a precipitate containing at least one of Ti, Al, Cr and V compounds by further neutralizing the sulfuric acid with a further alkaline compound,
   c) separating the precipitate containing Ti, Al, Cr and/or V compounds from the resulting reaction product to form an iron sulfate containing solution, and
   d) precipitating an iron oxide pigment from the Iron sulfate containing solution by adding an alkaline compound and an oxidizing agent.

2. The process of claim 1 comprising carrying out the neutralization of the waste acid with metallic iron or an iron compound at a pH of 0.5 to 4.7.

3. The process of claim 1 comprising carrying out the neutralization of the waste acid in the first stage successively with two or more iron-containing materials of different reactivity.

4. The process of claim 1 comprising carrying out the neutralization of the waste acid in a first stage with mill scale at a pH of 0.5 to 3.5 and then with cast iron turnings at a pH of 2.5 to 4.7.

5. The process of claim 1 comprising carrying out step b) with alkaline compounds at a pH of 3.0 to 5.0.

6. The process of claim 1 wherein the further neutralizing agent in the first stage are alkaline compounds that form sparingly soluble sulfates.

7. The process of claim 1 wherein the further neutralizing agent in the first stage power station ash, refuse incineration ash or another alkaline reacting ash.

8. The process of claim 1 comprising obtaining an iron sulfate-containing solution by separating the Ti-, Al-, Cr- and V-containing precipitate and adjusting the concentration of $FeSO_4$ to between 150 and 250 g per liter optionally by evaporation or dilution.

9. The process of claim 1 comprising converting the iron sulfate-containing solution to an iron oxide black pigment by adding an alkaline compound that does not form sparingly soluble sulfates and an oxidizing agent.

10. The process of claim 1 comprising converting the iron sulfate-containing solution to an iron oxide yellow pigment by adding an alkaline compound that does not form sparingly soluble sulfates and an oxidizing agent.

11. The process of claim 1 comprising using gaseous $NH_3$ or $NH_3$ dissolved in water or NaOH, KOH, MgO or $Mg(OH)_2$ in step (d) for precipitating the iron oxide pigments.

12. The process of claim 11 comprising using oxygen or an oxygen-containing gaseous mixture as the oxidizing agent.

13. The process of claim 1 wherein the iron oxide pigment has a manganese content of <0.11% by weight, based on Fe.

14. The process of claim 9 comprising baking the precipitated iron oxide black pigment to an iron oxide red pigment after separation, purification and drying.

15. The process of claim 10 comprising baking the precipitated iron oxide yellow pigment to an iron oxide red pigment after separation, purification and drying.

16. The process of claim 12 comprising using ammonia as neutralizing agent in step (d) and releasing it from the $(NH_4)_2SO_4$-containing solution obtained after separation of the precipitated iron oxide pigment, by adding CaO and/or $Ca(OH)_2$.

* * * * *